(12) United States Patent
Nakamura

(10) Patent No.: US 6,478,302 B1
(45) Date of Patent: Nov. 12, 2002

(54) METAL LAMINATE GASKET WITH IDENTIFICATION SIGN

(75) Inventor: Hironobu Nakamura, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 45 days.

(21) Appl. No.: 09/715,062

(22) Filed: Nov. 20, 2000

(30) Foreign Application Priority Data

Dec. 27, 1999 (JP) ............................................. 11-370570

(51) Int. Cl.$^7$ ................................................ F02F 11/00
(52) U.S. Cl. ....................... 277/317; 277/590; 277/591; 277/592; 277/593
(58) Field of Search ................................ 277/590, 591, 277/592, 593, 317

(56) References Cited

U.S. PATENT DOCUMENTS

| 4,776,601 | A | * | 10/1988 | Yamada | .................... | 277/598 |
| 5,141,237 | A | * | 8/1992 | Yamada et al. | ............. | 277/317 |
| 5,232,228 | A | * | 8/1993 | Miyaoh | ..................... | 277/313 |
| 5,281,464 | A | * | 1/1994 | Sekioka et al. | ............. | 277/598 |
| 5,957,463 | A | * | 9/1999 | Inamura | .................... | 277/593 |
| 5,961,126 | A | * | 10/1999 | Miyaoh | ..................... | 277/593 |
| 6,328,314 | B1 | * | 12/2001 | Jinno et al. | ................. | 277/593 |
| 6,347,801 | B1 | * | 2/2002 | Nakamura | .................. | 277/593 |

* cited by examiner

*Primary Examiner*—Anthony Knight
*Assistant Examiner*—Christopher Boswell
(74) *Attorney, Agent, or Firm*—Kanesaka & Takeuchi

(57) ABSTRACT

In the gasket, a shim member formed of shim portions and connecting portion is assembled with an upper metal plate with curved portions and flanges such that each shim portion is located between the flange and a base portion of the upper plate, and a lower metal plate is placed under the upper plate not to overlap the flanges and the shim member. The shim member is provided with an identification sign for identifying the thickness of the gasket and an assembly sign for identifying the orientation of the shim member at the connecting portion where the sealing ability is not affected, which can be seen from the back of the gasket after assembly. Therefore, when the shim member is assembled with the upper plate, the orientation of the shim member can be identified easily. Also, after assembly, the orientation of the shim member as well as the thickness of the gasket can be identified easily.

7 Claims, 3 Drawing Sheets

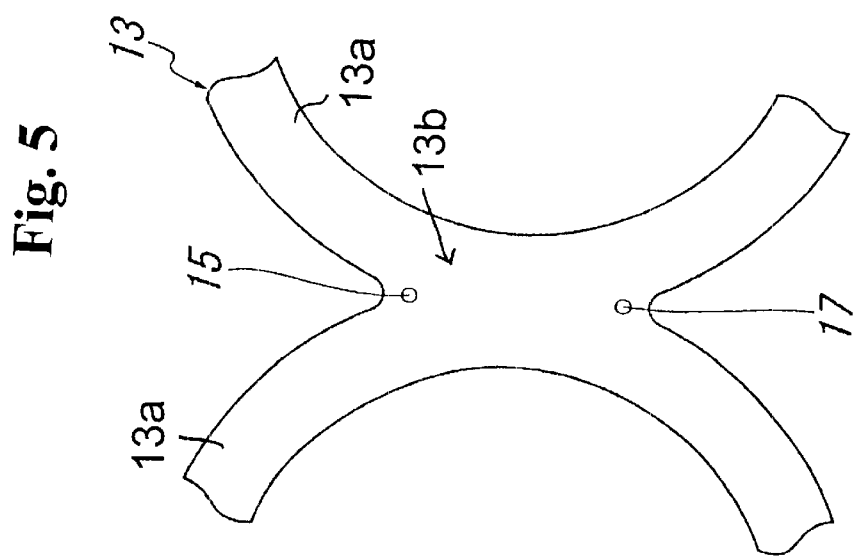
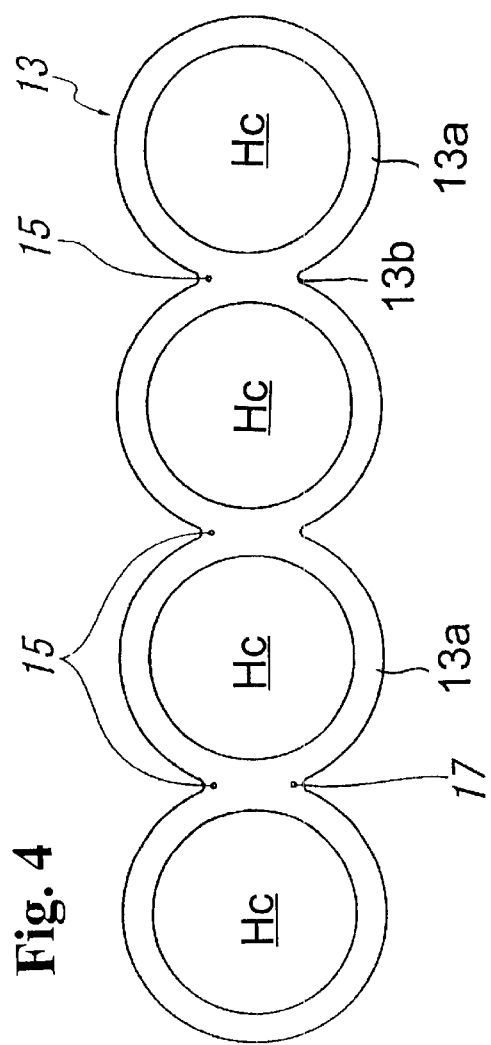

METAL LAMINATE GASKET WITH IDENTIFICATION SIGN

BACKGROUND OF THE INVENTION AND RELATED ART STATEMENT

The present invention relates to a metal laminate gasket with an identification sign, i.e. thickness identification sign of the gasket, especially for an open deck type engine.

Metal laminate gaskets have been used widely because of the strength against high pressure and high temperature, and durability thereof.

As one type of the metal laminate gaskets, a gasket is formed of a base metal plate having curved portions for defining cylinder bores and flanges extending from the curved portions, shims situated inside the flanges, and one or more metal plates laminated with the base metal plate. When the gasket is tightened between a cylinder head and a cylinder block, the flanges are strongly compressed to provide surface pressures thereat to thereby securely seal around the cylinder bores.

On the other hand, in case a cylinder head and a cylinder block are piled together without a gasket, a space between the cylinder head and the cylinder block becomes slightly different depending on the engines due to the manufacturing tolerance. In order to properly seal between the cylinder head and the cylinder block, one engine has several gaskets with different thicknesses. Before installing the gasket, the space between the cylinder head and the cylinder block is measured, and then, a gasket is selected depending on the space.

Therefore, one type of the gasket includes several gaskets with different thicknesses, and the gasket with the proper thickness must be selected and identified easily. Also, the selected gasket must be installed in the proper orientation.

In order to identify the gaskets, a gasket as disclosed in U.S. Pat. No. 5,141,237 has a plate information device. The patent works properly as intended, but the plate information device in the patent may not always formed at an ideal position. Therefore, the improvement is still required.

In view of the conventional gaskets, the present invention has been made, and an object of the invention is to provide a metal laminate gasket with a thickness identification sign, wherein the thickness of the gasket can be identified easily.

Another object of the invention is to provide a metal laminate gasket as stated above, wherein the orientation of the gasket can be also identified easily.

A further object of the invention is to provide a metal laminate gasket as stated above, wherein the gasket is suitable for an open deck type engine.

Further objects and advantages of the invention will be apparent from the following description of the invention.

SUMMARY OF THE INVENTION

A metal laminate gasket for an internal combustion engine of the invention is basically formed of a first metal plate, a shim member for adjusting a thickness of the gasket, and a second metal plate disposed under the first metal plate.

The first metal plate includes a base portion extending substantially throughout an entire area to be sealed, a plurality of cylinder bores formed in the first metal plate, a plurality of curved portions extending from the base portion to define the cylinder bores, and flanges extending from the respective curved portions to be disposed under the base portion. The shim member includes at least two shim portions, and at least one connecting portion for connecting the shim portions. Each shim portion is disposed between the base portion and one flange. Thus, the connecting portion is located between two flanges without overlapping therewith. The second metal plate has a shape such that the second metal plate does not overlap the flanges and the shim member including the connecting portion.

In the present invention, an identification sign for the gasket is formed at the connecting portion where sealing is not affected, to thereby identify the thickness of the gasket. The identification sign can be seen easily from the back side of the gasket.

In the invention, since the identification sign is formed at the connecting portion of the shim member, which is seen from the back side of the gasket without cutting any part of the gasket, the identification sign can be formed easily. Also, the identification sign does not affect the sealing ability of the gasket at the connecting portion. Thus, the gasket with the identification sign can be made easily. The gasket of the invention is especially useful for the open deck type engine.

Preferably, the second metal plate has a thickness greater than a thickness of the shim member and less than a total thickness of the shim member and the first metal plate. Thus, the gasket can provide high surface pressure at the shim portions around the cylinder bores.

The shim member is selected from a plurality of shim members with different thicknesses. Also, the shim members have the identification signs different from each other. Also, the second metal plate is selected from a plurality of second metal plates with different thicknesses. One shim member is assembled with one second metal plate so that a difference between the thickness of the second metal plate and the total thickness of the shim member and the first metal plate is constant throughout combinations of the shim members and the second metal plates while the thicknesses of the gasket are changed.

Accordingly, if a space between a cylinder head and a cylinder block is different, the gasket with the proper thickness can be selected and installed in the engine. Although the space between the cylinder head and the cylinder block is slightly different due to the manufacturing tolerance, the same quality engine can be provided.

The gasket further includes an assembly sign formed at the connecting portion of the shim member where the sealing is not affected to thereby identify a direction or orientation of the shim member relative to the first metal plate when the shim member is assembled with the first metal plate. Also, the direction or orientation of the gasket with the shim member can be identified when the gasket is install in the engine.

BRIEF DESCRIPTION OF THE DRAWINGS

FIG. 4 is a plan view of a shim member used in the cylinder head gasket of the invention; and FIG. 5 is a partially enlarged view of the shim member shown in FIG. 4.

DETAILED DESCRIPTION OF THE PREFERRED EMBODIMENTS

Figure 1:
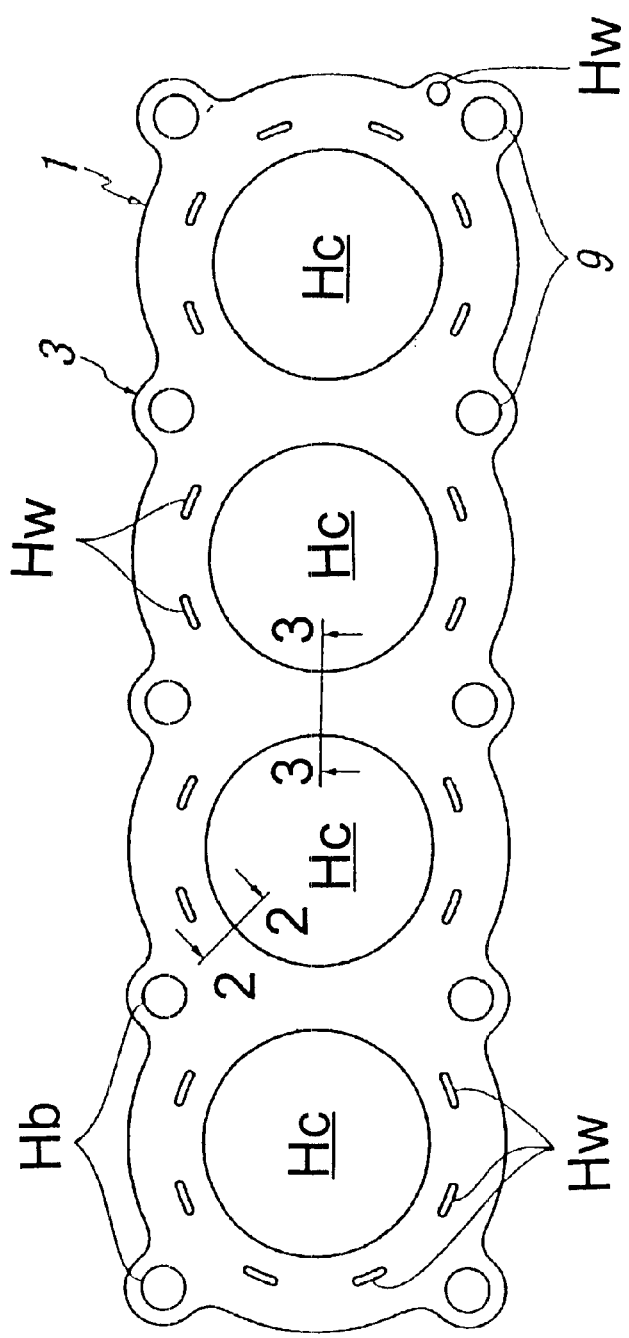
FIG. 1 is a plan view of a cylinder head gasket of the invention to be used in an open deck type engine.
Figure 2:
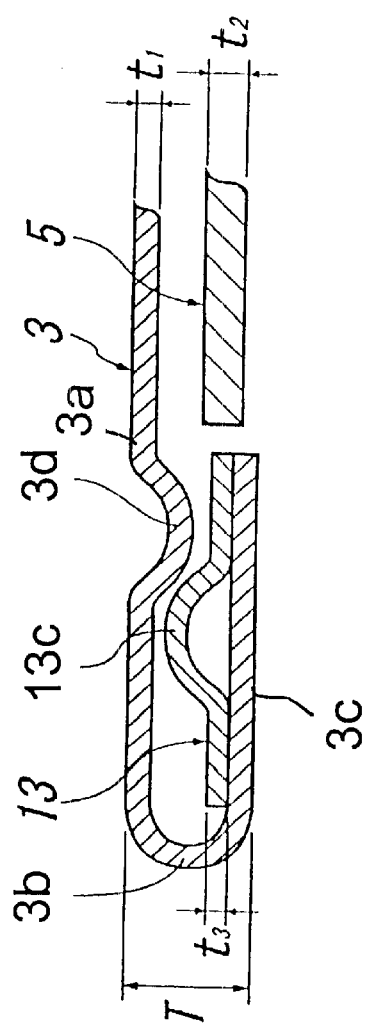
FIG. 2 is an enlarged cross sectional view taken along line 2—2 in FIG. 1.
Figure 3:
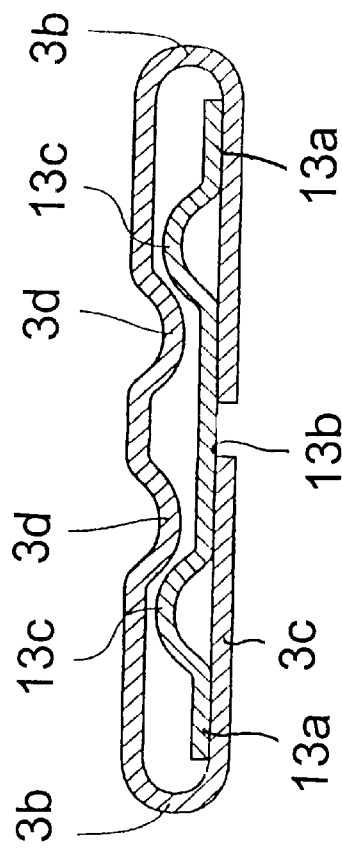
FIG. 3 is an enlarged cross sectional view taken along line 3—3 in FIG. 1.

With reference to the drawings, the present invention will be explained in detail.

The gasket 1 as shown in the drawings is used for an open deck type engine with four cylinders. The gasket 1 includes four cylinder bores Hc, elongated water holes Hw surrounding the cylinder bores Hc, and bolt holes Hb formed outside the water holes Hw, as in the conventional gasket. Also, the gasket 1 is formed of an upper metal plate 3, a lower metal plate 5 disposed under the upper metal plate 3, and a metal shim member 13.

The upper plate 3 includes a base portion 3a extending substantially throughout an entire area of the gasket to be sealed, curved portions 3b extending downwardly from the base portion 3a to define the cylinder bores Hc, and flanges 3c extending from the cured portions 3b in the direction away from the cylinder bores Hc. The flanges 3c are located under the base portion 3a without overlapping or blocking the water holes Hw. Also, beads 3d are formed around the cylinder bores Hc to extend toward the flange 3c.

The shim member 13 is formed of four shim portions 13a, and connecting portions 13b for connecting the shim portions 13a together. Each shim portion 13a includes a bead 13c completely surrounding the shim portion 13a, and is located between the base portion 3a and the flange 3c. When the shim member 13 is assembled with the upper plate 3, the bead 13c extends upwardly and is located radially inwardly of the bead 3d of the upper plate 3.

The lower plate 5 has a shape such that the lower plate 5 does not overlap the flange 3c and the shim member 13. Thus, when the gasket is assembled, the lower plate 5 directly contacts the base portion 3a.

In case the upper plate 3, lower plate 5 and shim member 13 have thicknesses $t_1$, $t_2$ and $t_3$, the thickness $t_2$ of the lower plate 5 is greater than the thickness $t_3$ of the shim member 13, but less than the total thicknesses $t_1$, and $t_3$ of the upper plate 3 and the shim member 13. Thus, when the gasket is situated between a cylinder block and a cylinder head (both not shown) and is tightened, a high surface pressure is formed at the flange to thereby securely seal around the cylinder bore.

In the invention, a plurality of shim members 13 with different thicknesses and a plurality of lower plates 5 with different thicknesses are prepared. These plates and shim members are assembled such that the difference between the thickness $t_2$ of the lower plate 5 and the total thicknesses $t_1+t_2$ of the upper plate 3 and the shim member 13 is constant, though the thicknesses of the gaskets are different from each other.

In manufacturing the cylinder heads and the cylinder blocks, the cylinder heads and the cylinder blocks are made uniformly. However, when the cylinder block and the cylinder head are assembled without a gasket, a space between the cylinder block and the cylinder head is not uniform because of the manufacturing tolerance.

In order to provide engines with uniform characteristics, therefore, the gaskets with different thicknesses are prepared as explained above while the plate difference is constant. Namely, in manufacturing the engines, when the space between the cylinder head and the cylinder block is narrow, the gasket with the large thickness is installed. On the other hand, when the space between the cylinder head and the cylinder block is wide, the gasket with the thin thickness is installed. Although the thicknesses of the gaskets are different, since the difference in thickness at the flange relative to the lower plate is the same, the engines can provide the same characteristics.

In the invention, since a plurality of the gaskets is formed with the same configurations but different thicknesses, it is very difficult to distinguish the gaskets by eyes. Therefore, as shown in FIGS. 4 and 5, an identification sign 15 is formed at the connecting portion 13b of the shim member 13. Since the connecting portion 13b where the identification sign 15 is formed does not affect the sealing ability of the gasket, when the gasket is installed in the engine, the sealing ability of the gasket is not damaged by the identification sign 15. The gasket can securely seal around the cylinder bores.

In this example, the identification sign 15 is formed of holes located at three connecting portions 13b of the shim member 13. However, the identification sign 15 may be one or a plurality of holes formed at one of the connecting portions 13b or any other sign, such as projection, dent or numeral.

The identification sign 15 is used to show the thickness or grade of the gasket. However, in order to form the gaskets with different thicknesses, the specific shim member 13 and the specific lower plate 5 are assembled as one combination, respectively. Thus, a sign (not shown), such as a hole, may be formed on the lower plate at a portion, e.g. facing the identification sign 15. Accordingly, the combination of the lower plate and the shim member can be easily identified in assembling the gasket.

In the present invention, further, an assembly or orientation sign 17 of the shim member 13 is formed at the connection portion 13b of the shim member 13 where the sealing ability of the gasket is not affected. The assembly sign 17 is a hole and is located at the connecting portion 13b at one end of the shim member 13 to identify the direction or orientation of the shim member 13 when it is assembled with the upper plate 3. Also, the assembly sign 17 is formed at a portion to be seen from the bottom of the gasket after assembly. Accordingly, the orientation of the shim member 13 can be confirmed after assembly.

In the present invention, the identification sign 15 and the assembly sign 17 are formed of holes. However, the identification sign 15 and the assembly sign 17 may be a notch, projection or other sign, and the number of the notch, projection or sign may be changed freely.

In the gasket of the present invention, the shim member formed of the shim portions and connecting portion is assembled with the upper metal plate with the curved portions and flanges such that each shim portion is located between the flange and the base portion of the upper plate, and the lower metal plate is placed under the upper plate not to overlap the flange and the shim member. The shim member is provided with the identification sign for identifying the thickness of the gasket and the assembly sign for identifying the orientation of the shim member at the connecting portion where the sealing ability is not affected, which can be seen from the back of the gasket after assembly. Therefore, when the shim member is assembled with the upper plate, the orientation of the shim member can be identified easily. Also, after assembly, the orientation of the shim member as well as the thickness of the gasket can be identified easily.

While the invention has been explained with reference to the specific embodiments of the invention, the explanation is illustrative and the invention is limited only by the appended claims.

What is claimed is:

1. A metal laminate gasket for an internal combustion engine, comprising:

a first metal plate including a base portion extending substantially throughout an entire area to be sealed, a plurality of cylinder bores formed in the first metal plate, a plurality of curved portions extending from the base portion to define the cylinder bores, and flanges extending from the respective curved portions to be disposed under the base portion, a shim member for adjusting a thickness of the gasket including at least two shim portions and at least one connecting portion for connecting the shim portions, each shim portion being disposed between the base portion and one of the flanges so that the at least one connecting portion is located between two of the flanges adjacent to each other without overlapping therewith, a second metal plate disposed under the first metal plate, said second metal plate having a shape such that the second metal plate does not overlap the flanges and the shim member including the at least one connecting portion, and an identification sign formed at the at least one connecting portion where sealing is not affected, to thereby identify a thickness of the gasket.

2. A metal laminate gasket according to claim 1, wherein said second metal plate has a thickness greater than a thickness of the shim member and less than a total thickness of the shim member and the first metal plate.

3. A metal laminate gasket according to claim 2, wherein said shim member is selected from a plurality of shim members with different thicknesses, said shim members having said identification signs different from each other.

4. A metal laminate gasket according to claim 3, wherein said second metal plate is selected from a plurality of second metal plates with different thicknesses, one shim member being assembled with one second metal plate so that a difference in thickness between the thickness of the second metal plate and the total thickness of the shim member and the first metal plate is constant throughout combinations of the shim members and the second metal plates while thicknesses of the gasket are changed.

5. A metal laminate gasket according to claim 4, further comprising an assembly sign formed at the connecting portion where the sealing is not affected to thereby identify a direction of the shim member relative to the first metal plate and a direction of the gasket relative to an engine to be installed when assembling the gasket to the engine.

6. A metal laminate gasket according to claim 5, wherein said shim portion includes a bead sandwiched between the base portion and the flange and extending toward the base portion, and said base portion includes a bead extending toward the flange and located adjacent to the bead of the shim portion.

7. A metal laminate gasket according to claim 6, wherein said gasket includes elongated water holes around the cylinder bores for an open deck engine.

* * * * *

UNITED STATES PATENT AND TRADEMARK OFFICE
CERTIFICATE OF CORRECTION

PATENT NO.    : 6,478,302 B1
DATED         : November 12, 2002
INVENTOR(S)   : Hironobu Nakamura It is certified that error appears in the above-identified patent and that said Letters Patent is hereby corrected as shown below:

Column 1,
Line 40, change "always formed" to -- always be formed --;

Column 2,
Line 50, change "install" to -- installed --; and

Column 3,
Line 44, change "$t_1 + t_2$" to -- $-t_1 + t_3$ --.

Signed and Sealed this

Eighteenth Day of February, 2003

JAMES E. ROGAN
*Director of the United States Patent and Trademark Office*